(12) United States Patent
McAdam et al.

(10) Patent No.: US 10,920,887 B2
(45) Date of Patent: Feb. 16, 2021

(54) ANTI-EXTRUSION SEAL ARRANGEMENT AND RAM-STYLE BLOWOUT PREVENTER

(71) Applicant: Dreco Energy Services ULC, Edmonton (CA)

(72) Inventors: David McAdam, Calgary (CA); Brian McAdam, Calgary (CA); James Orr, Sherwood Park (CA)

(73) Assignee: DRECO ENERGY SERVICES ULC, Calgary (CA)

( * ) Notice: Subject to any disclaimer, the term of this patent is extended or adjusted under 35 U.S.C. 154(b) by 73 days.

(21) Appl. No.: 16/076,574

(22) PCT Filed: Feb. 10, 2017

(86) PCT No.: PCT/CA2017/050161
§ 371 (c)(1),
(2) Date: Aug. 8, 2018

(87) PCT Pub. No.: WO2017/136948
PCT Pub. Date: Aug. 17, 2017

(65) Prior Publication Data
US 2019/0049017 A1    Feb. 14, 2019

Related U.S. Application Data

(60) Provisional application No. 62/293,718, filed on Feb. 10, 2016.

(51) Int. Cl.
*F16J 15/32* (2016.01)
*F16J 15/16* (2006.01)
(Continued)

(52) U.S. Cl.
CPC ........... *F16J 15/166* (2013.01); *E21B 33/062* (2013.01); *F16J 15/32* (2013.01); *F16J 15/3208* (2013.01)

(58) Field of Classification Search
CPC ........ F16J 15/166; F16J 15/32; F16J 15/3208; E21B 33/062
See application file for complete search history.

(56) References Cited

U.S. PATENT DOCUMENTS

| 665,073 A | 1/1901 | Doyle et al. |
| 958,862 A | 5/1910 | Durham |

(Continued)

FOREIGN PATENT DOCUMENTS

| CA | 2153612 | 2/1997 |
| CA | 2544718 | 11/2006 |

(Continued)

OTHER PUBLICATIONS

International Search Report and Written Opinion for related PCT Application No. PCT/CA2018/000101 dated Oct. 26, 2018 (9 pages).

(Continued)

*Primary Examiner* — Gilbert Y Lee
(74) *Attorney, Agent, or Firm* — Schwegman Lundberg & Woessner, P.A.

(57) ABSTRACT

A blowout preventer (BOP) and a seal anti-extrusion apparatus is provided for well control about a tubular such as a polish rod. Each of opposing ram blocks support a semi-circular primary seal and at least one downstream backup ring. An extrusion gap is formed between the ram block and the rod. The backup ring has profile that is axially compressible by the primary seal when activated, causing an inner diameter diminish, and closing the extrusion gap for improved sealing integrity of the primary seal.

18 Claims, 12 Drawing Sheets

(51) Int. Cl.
*E21B 33/06* (2006.01)
*F16J 15/3208* (2016.01)

(56) References Cited

U.S. PATENT DOCUMENTS

| | | | |
|---|---|---|---|
| 1,517,504 A | 12/1924 | Hansen | |
| 1,517,540 A | 12/1924 | Hansen | |
| 1,891,417 A | 12/1932 | Heggem | |
| 2,059,798 A | 11/1936 | Kniss | |
| 2,237,709 A | 4/1941 | Lowe | |
| 2,258,887 A | 10/1941 | Fortune | |
| 2,573,832 A | 11/1951 | Callahan | |
| 2,846,013 A | 8/1958 | Davis | |
| 3,084,946 A | 4/1963 | Sharp | |
| 3,149,514 A | 9/1964 | Shaub | |
| 3,186,722 A | 6/1965 | Johnston | |
| 3,195,645 A * | 7/1965 | Loomis | E21B 33/1216 277/337 |
| 3,651,717 A | 3/1972 | Johnston | |
| 3,716,245 A | 2/1973 | Turolla | |
| 3,796,103 A | 3/1974 | Winfield | |
| 3,830,304 A | 8/1974 | Cummins | |
| 4,071,085 A | 1/1978 | Grable et al. | |
| 4,153,111 A | 5/1979 | Lans et al. | |
| 4,407,510 A | 10/1983 | Cornelius et al. | |
| 4,560,176 A | 12/1985 | Hoff | |
| 4,580,762 A | 4/1986 | Hirtz et al. | |
| 4,583,569 A | 4/1986 | Ahlstone | |
| 4,613,140 A | 9/1986 | Knox | |
| 4,716,970 A | 1/1988 | Henning | |
| 4,777,849 A | 10/1988 | Sears | |
| 4,865,245 A | 9/1989 | Schulte et al. | |
| 4,889,184 A | 12/1989 | Lugtmeier et al. | |
| 4,951,743 A | 8/1990 | Henderson | |
| 5,257,812 A | 11/1993 | Osorio et al. | |
| 5,400,857 A | 3/1995 | Whitby et al. | |
| 5,408,901 A | 4/1995 | Bishop | |
| 5,636,688 A | 6/1997 | Bassinger | |
| 5,641,019 A * | 6/1997 | Stout | E21B 33/1208 166/179 |
| 5,711,533 A | 2/1998 | Angelo et al. | |
| 5,791,411 A | 8/1998 | Ricalton et al. | |
| 5,865,245 A | 2/1999 | Trout et al. | |
| 6,176,466 B1 | 1/2001 | Lam et al. | |
| 7,216,872 B1 * | 5/2007 | Shaw | F16L 23/16 166/115 |
| 8,544,535 B2 | 10/2013 | Cote et al. | |
| 8,631,861 B1 | 2/2014 | Busch | |
| 8,746,345 B2 | 6/2014 | Kotrla et al. | |
| 8,899,338 B2 | 12/2014 | Elsayed et al. | |
| 9,188,122 B1 | 11/2015 | Reed | |
| 9,702,203 B2 | 7/2017 | Bolstad, Jr. | |
| 10,597,968 B2 | 3/2020 | McAdam et al. | |
| 2003/0070806 A1 | 4/2003 | Connell et al. | |
| 2003/0221844 A1 | 12/2003 | Dallas | |
| 2006/0081368 A1 | 4/2006 | Rosine et al. | |
| 2006/0124314 A1 | 6/2006 | Haheim et al. | |
| 2008/0078558 A1 | 4/2008 | Dallas | |
| 2009/0056930 A1 | 3/2009 | Angelle et al. | |
| 2009/0260834 A1 | 10/2009 | Henson et al. | |
| 2011/0168405 A1 | 7/2011 | Parlee | |
| 2011/0198072 A1 | 8/2011 | Cote et al. | |
| 2011/0203670 A1 | 8/2011 | Braddick | |
| 2011/0266005 A1 | 11/2011 | Hult et al. | |
| 2011/0278515 A1 | 11/2011 | Perio | |
| 2012/0012339 A1 * | 1/2012 | Weir | E21B 33/062 166/386 |
| 2012/0012340 A1 * | 1/2012 | Ensley | E21B 33/062 166/386 |
| 2012/0024521 A1 | 2/2012 | Villa | |
| 2012/0305102 A1 | 12/2012 | Kukielka | |
| 2013/0126157 A1 | 5/2013 | Farrar | |
| 2013/0126763 A1 | 5/2013 | Guo et al. | |
| 2013/0147121 A1 | 6/2013 | Xu | |
| 2013/0180733 A1 | 7/2013 | Bradshaw et al. | |
| 2013/0199773 A1 | 8/2013 | Tebay | |
| 2013/0327528 A1 | 12/2013 | Frost | |
| 2013/0341045 A1 | 12/2013 | Flusche | |
| 2015/0047858 A1 | 2/2015 | Varkey et al. | |
| 2015/0218903 A1 * | 8/2015 | Sellers, Jr. | F16J 15/164 166/380 |
| 2015/0285013 A1 | 10/2015 | Johnson et al. | |
| 2015/0300106 A1 | 10/2015 | Martin et al. | |
| 2016/0251917 A1 | 9/2016 | Harrell et al. | |
| 2017/0146007 A1 | 5/2017 | Robison et al. | |
| 2017/0306745 A1 | 10/2017 | Harding et al. | |
| 2018/0202254 A1 | 7/2018 | Mcadam et al. | |
| 2019/0040696 A1 | 2/2019 | Mcadam et al. | |
| 2019/0093441 A1 | 3/2019 | Mcadam et al. | |
| 2019/0234167 A1 | 8/2019 | Mcadam et al. | |
| 2019/0360299 A1 | 11/2019 | Mcadam et al. | |
| 2020/0298385 A1 | 9/2020 | Mcadam et al. | |

FOREIGN PATENT DOCUMENTS

| | | |
|---|---|---|
| CA | 20509182 | 12/2006 |
| CA | 2942857 | 10/2015 |
| CA | 2991538 A1 | 1/2017 |
| CA | 3013084 A1 | 8/2017 |
| CN | 2567336 | 8/2003 |
| CN | 202090881 | 12/2011 |
| CN | 202731817 | 2/2013 |
| GB | 2206932 | 2/1989 |
| WO | WO-2017004696 A1 | 1/2017 |
| WO | WO-2018018142 A1 | 2/2018 |
| WO | WO-2018049503 A1 | 3/2018 |
| WO | WO-2018129620 A1 | 7/2018 |
| WO | WO-2018213918 A1 | 11/2018 |
| WO | WO-2019056088 A1 | 3/2019 |

OTHER PUBLICATIONS

Search Report and Written Opinion for related PCT application PCT/CA2017/050161 dated Apr. 24, 2017 (7 pages).

Search Report and Written Opinion for related PCT application PCT/CA2017/050890 dated Oct. 17, 2017 (7 pages).

Search Report and Written Opinion for related PCT application PCT/CA2017/050963 dated Nov. 8, 2017 (8 pages).

International Search Report and Written opinion for related PCT application PCT/CA2016/051532 dated Jan. 23, 2017 (8 pages).

International Search Report and Written Opinion for related PCT Application No. PCT/CA2018/050025 dated Apr. 4, 2018 (8 pages).

International Search Report and Written Opinion for PCT Application No. PCT/CA2016/050373 dated May 30, 2016 (7 pages).

"U.S. Appl. No. 15/742,632, Corrected Notice of Allowability dated Jan. 21, 2020", 2 pgs.

"U.S. Appl. No. 15/742,632, Non Final Office Action dated Jun. 26, 2019", 13 pgs.

"U.S. Appl. No. 15/742,632, Notice of Allowance dated Nov. 14, 2019", 5 pgs.

"U.S. Appl. No. 15/742,632, Preliminary Amendment filed Jan. 8, 2018", 3 pgs.

"U.S. Appl. No. 15/742,632, Response filed Oct. 28, 2019 to Non-Final Office Action dated Jun. 26, 2019", 9 pgs.

"U.S. Appl. No. 15/989,877, Final Office Action dated Jun. 1, 2020", 18 pgs.

"U.S. Appl. No. 15/989,877, Non Final Office Action dated Dec. 6, 2019", 17 pgs.

"U.S. Appl. No. 15/989,877, Response filed Mar. 6, 2020 to Non Final Office Action dated Dec. 6, 2019", 9 pgs.

"U.S. Appl. No. 16/139,690, Non Final Office Action dated May 13, 2020", 13 pgs.

"U.S. Appl. No. 16/316,661, Notice of Allowance dated Jun. 17, 2020", 9 pgs.

"U.S. Appl. No. 16/316,661, Preliminary Amendment filed Jan. 10, 2019", 5 pgs.

"U.S. Appl. No. 16/478,061, Preliminary Amendment filed Jul. 15, 2019", 8 pgs.

(56) References Cited

OTHER PUBLICATIONS

"International Application Serial No. PCT/CA2016/050373, International Preliminary Report on Patentability dated Jan. 18, 2018", 6 pgs.
"International Application Serial No. PCT/CA2016/051532, International Preliminary Report on Patentability dated Mar. 28, 2019", 7 pgs.
"International Application Serial No. PCT/CA2017/050161, International Preliminary Report on Patentability dated Aug. 14, 2018", 5 pgs.
"International Application Serial No. PCT/CA2017/050890, International Preliminary Report on Patentability dated Feb. 7, 2019", 7 pgs.
"International Application Serial No. PCT/CA2018/000101, International Preliminary Report on Patentability dated Dec. 5, 2019", 6 pgs.
"International Application Serial No. PCT/CA2018/000179, International Preliminary Report on Patentability dated Dec. 12, 2019", 8 pgs.
"International Application Serial No. PCT/CA2018/000179, International Search Report dated Dec. 21, 2018", 3 pgs.
"International Application Serial No. PCT/CA2018/000179, Response filed Jul. 25, 2019 to Written Opinion dated Dec. 21, 2018", 5 pgs.
"International Application Serial No. PCT/CA2018/000179, Written Opinion dated Dec. 21, 2018", 4 pgs.
"International Application Serial No. PCT/CA2018/050025, International Preliminary Report on Patentability dated Jul. 25, 2019", 6 pgs.
"KH2030 20mm Ball Bushing 20x28x30 Linear Motion Bearing", VXB.com Bearings, [Online]. Retrieved from the Internet: <URL: http://www.vxb.com/KH2030-20mm-Ball-Bushing-20x28x30-Linear-Motion-p/Kit7140.htm?gclid=EAIaIQobChMIsda3qpOc2wIVAtvACh1MIwBVEAYYBSABEgK7HvD_BwE, (Accessed May 14, 2020), 7 pgs.
"Pro Align (Opal)", Bell Industries a Division of Bell Envirotech Inc., [Online]. Retrieved from the Internet: <URL: http://www.bellindustries.oa/index.php/gallery1/harbison-fiseher/pro-align>, (2020), 2 pgs.
"Pro Align (Opal)", Harbison-Fischer Well Head Tools, (2020), 1 pg.
"Rod String", Dynatec International Ltd., [Online]. Retrieved from the Internet: <URL: https://protect-us.mimecast.com/s/0F_HC9rOL0HkW2oNHODTVr?domain=nelgarservices.com>, (2012), 1 pg.
"Rod-Knuckle Environmental Bob Stuffing Box", Nelgar Services Inc., [Online]. Retrieved from the Internet: <URL: https://protect-us.mimecast.com/s/0F_HC9rOL0HkW2oNHODTVr?domain=nelgarservices.com>, (2017), 4 pgs.
"Rod-Pump Accessories", Apergy Artificial Lift Technologies, [Online]. Retrieved from the Internet: <URL: https://apergyals.com/products/rod-lift/harbison-fischer/rod-pump-accessories/>, (2020), 11 pgs.
"The Weekly Screw", The Virtual Corkscrew Museum's Weekly Newspaper No. 469, [Online]. [Accessed Nov. 8, 2018]. Retrieved from the Internet: <URL: http://www.bullworks.net/daily/20070722.htm>, (Jul. 22, 2007), 14 pgs.
"Wellhead Accessories", Apergy Artificial Lift Technologies, [Online]. Retrieved from the Internet: <URL: https://apergyals.com/products/rod-lift/harbison-fischer/wellhead-accessories>, (2020), 7 pgs.
"U.S. Appl. No. 16/478,061, Non Final Office Action dated Aug. 5, 2020", 15 pgs.
"U.S. Appl. No. 16/139,690, Response filed Aug. 10, 2020 to Non Final Office Action dated May 13, 2020", 11 pgs.
"U.S. Appl. No. 15/989,877, Examiner Interview Summary dated Aug. 18, 2020", 3 pgs.
"U.S. Appl. No. 15/989,877, Response filed Sep. 1, 2020 to Final Office Action dated Jun. 1, 2020".
"U.S. Appl. No. 16/316,661, Notice of Allowance dated Sep. 17, 2020", 8 pgs.
"U.S. Appl. No. 16/316,661, Supplemental Notice of Allowability dated Sep. 30, 2020", 2 pgs.
"U.S. Appl. No. 15/989,877, Non Final Office Action dated Oct. 1, 2020", 19 pgs.
U.S. Appl. No. 16/316,661, filed Jan. 10, 2019, Method and Apparatus for Production Well Pressure Containment for Blowout.
U.S. Appl. No. 15/989,877, filed May 25, 2018, Method and Apparatus for Rod Alignment.
U.S. Appl. No. 16/139,690, filed Sep. 24, 2018, Adjustable Blowout Preventer and Methods of Use.
U.S. Appl. No. 15/742,632, U.S. Pat. No. 10,597,968, filed Jan. 8, 2018, Modified Stuffing Box.
U.S. Appl. No. 16/478,061, filed Jul. 15, 2019, Multifunction Blowout Preventer.
U.S. Appl. No. 16/358,069, filed Mar. 19, 2019, Packing Material Compaction and Extraction Tool.

\* cited by examiner

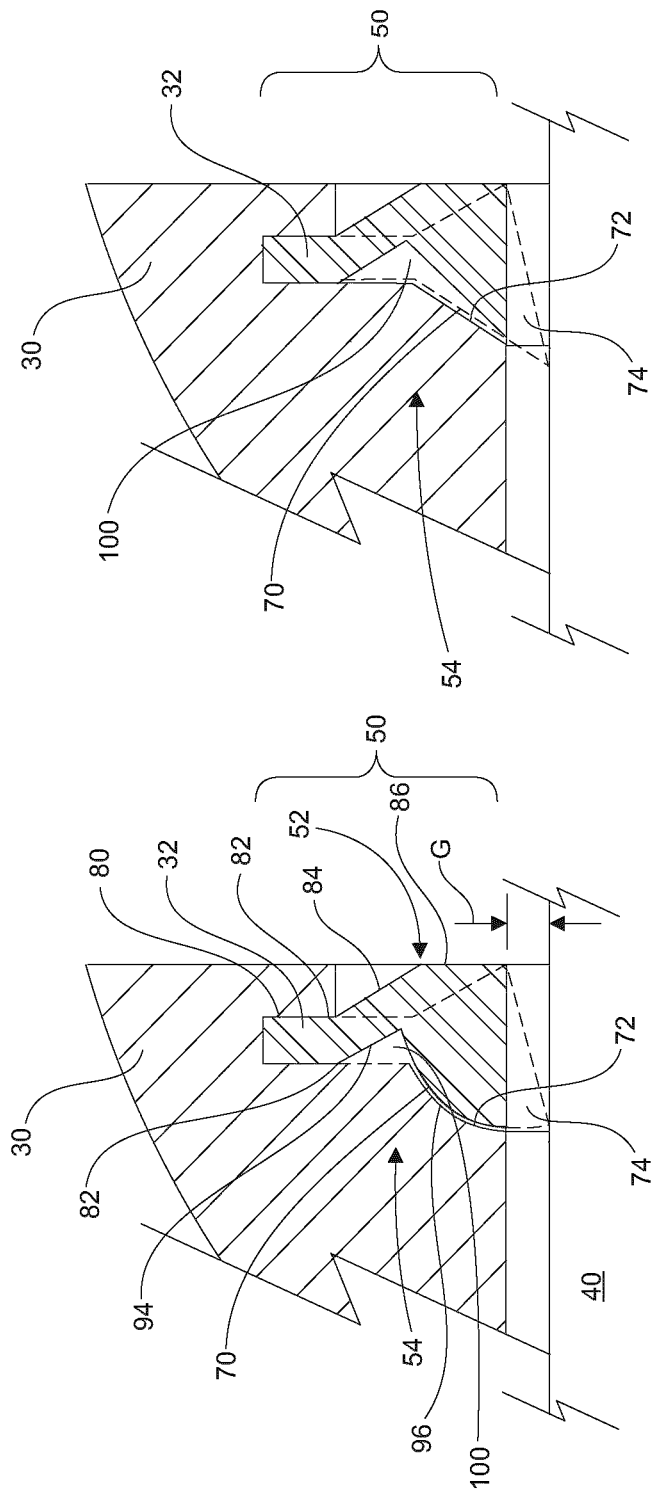

ures and loads. In
ANTI-EXTRUSION SEAL ARRANGEMENT AND RAM-STYLE BLOWOUT PREVENTER

CROSS REFERENCE AND RELATED APPLICATIONS

This Application claims priority to the U.S. Provisional Patent Application No. 62/293,718, filed Feb. 10, 2016, which is incorporated by reference in its entirety.

FIELD

Embodiments herein relate generally to the field of blowout preventers (BOPs) used in oil and gas operations for well control, and more particularly to ram blocks for BOPs having a seal and backup ring configuration for extrusion resistance and improved sealing.

BACKGROUND

Blowout preventers are well known and commonly used to prevent a well "blowout", which occurs when fluid from the well escapes uncontrollably from the wellhead. Ram-style blowout preventers are known for closing onto a tubular extending generally coaxially through the wellhead. At least one pair of opposing rams supported on the wellhead are operable to the bore of the wellhead, or to close on a tubular passing therethrough and seal thereabout, restricting or stopping entirely fluid flow out of the well.

The blowout preventers commonly comprise a main body having a through bore. The main body is connected at the wellhead forming a through bore in fluid communication with the well. The through bore forms part of a main flow channel for fluids passing between the well and the bore. The body is provided with a pair of opposing ram actuators arranged perpendicularly to the flow of fluid through the bore.

Each ram actuator is provided with ram "block" on the end of each ram actuator, each block is fit slidably yet sealably to the main body. The opposing blocks have opposing faces that engage each other when actuated, and are specifically configured for the particular type blowout preventer, such as for a pipe ram type, blind ram type, shear ram type, or multi-ram type. The ram blocks are manufactured of metal and include an arcuate recess at their faces and aligned with the through bore axis to receive and grip the tubular therebetween in metal-to-metal contact. To seal the blocks to the tubular, elastomeric seals extend circumferentially about the arcuate recess and stand proud of the face to engage the tubular.

The seals bear against the tubular and balance of opposing block to seal and thereby restrict the flow of fluids thereby when actuated. Ram blocks for sealing to tubulars such as pipes are fit with semi-circular grooves and semi-circular seals. A wellhead may be provided with a stack of separate or integrated blowout preventers and may also comprise a backup of each.

During activation, the components of the blowout preventers are subjected to extremely high stresses and loads. In particular, where seals within the blowout preventer become damaged or extrude into the extrusion gap, full or partial leakage of the blowout preventer is likely to occur, representing a failure. Complicating matters is that ram-type blowout preventers require that the ram blocks and corresponding seals be arranged to open and close around the tubular members passing through the bore. When closed on the tubular, such as about a polished rod, seal is divided into two separate semi-circular parts that together seal about the annular interface formed about the tubular between the opposing ram blocks and the tubular.

The possibility of a seal extruding into an extrusion gap from by the annular interface increases based upon the size of the extrusion gap, the pressures imposed on the seal, and the materials used to manufacture the seal. Softer materials are more susceptible to extrusion. The extrusion gap can be decreased by making the outer diameter (OD) of the tube or rod passing through the bore as close as possible to the inner diameter (ID) of the outer cylinder. By way of example, seal manufacturer Parker Hannifin™ recommends a diametrical clearance between approximately 0.002-0.007 inches for effective extrusion resistance. Such clearances are small for practical application to BOPs.

A skilled person would understand, however, that the closer in diameter are the inner tubular member, and the semi-circular surfaces or recesses of the opposing ram block faces being sealed, the more likely the circumstance that the two elements will connect and scrape against each other, particularly where the elements are misaligned or not perfectly round. Due to the particular configurations of ram type blowout preventers and need for larger tolerances, the inner diameter (ID) of the semi-circular faces of the ram blocks, which are metal, are purposefully oversized compared to the OD of the inner tubular member, thereby compensating for an off center tubular that otherwise could be easily damaged, or damage the seals, when contacted by closing ram blocks.

Challenges remain in connection with the use of blowout preventers and ensuring that a functional seal is provided even at extremely high wellbore pressures (e.g. up to 10,000 psi). The sealing of annular spaces, such as about tubular is known and generally successful when the seal is also annular. However, with opposing ram blocks, the seals are discrete and discontinuous circumferentially or across the bore of the main body. Challenges include the heightened risk of seal damage and extrusion at the sealing interface as the wellbore pressure increases. There remains a need for apparatus and methodologies of improving the sealing capacities of ram-style blowout preventers.

SUMMARY

Generally, a seal anti-extrusion apparatus is provided for improving seal integrity with extrusion gaps greater than that suggested by skilled seal designers and suppliers. A backup ring is supported in an annular groove about the tubular to be sealed. The backup ring has a cross-sectional ring profile compressible axially between a resting position and compressed position wherein the ring profile flattens and the inner diameter diminishes to reduce the extrusion gap. Adjacent to and coupled with a primary seal, upon axial loading imposed by the primary seal the ring profile flattens and the inner diameter diminishes to reduce the extrusion gap Distinguished from the prior art backup rings for seals such as O-rings and the like, the diameter of which stretches when fit about a tubular, the anti-extrusion backup ring of the current embodiment has an inside diameter that is initially larger than that of the tubular to be sealed. When the backup ring is engaged and compressed axially, the internal diameter becomes smaller and under increased axial loads, is caused to become even smaller. The backup ring, disclosed herein can minimize the extrusion gap or close it completely In one aspect, an anti-extrusion apparatus is provided for a tubular extending through bore in a body and forming an extrusion gap therebetween, comprising a primary seal supported in the body and extending about a circumference of the tubular; and a backup ring supported in an annular groove in the body axially adjacent the primary seal, the backup ring having an inner diameter extending about the tubular. The backup ring is flexible, having a cross-sectional ring profile axially compressible between a resting position and compressed position, wherein upon axial loading by the primary seal the ring profile flattens and the inner diameter diminishes to reduce the extrusion gap.

In another aspect, an anti-extrusion apparatus for a blowout preventer is provided, comprising opposing ram blocks, each ram block having a block face and tubular-receiving recess formed across the face, each recess receiving a portion of a circumference of a tubular extending axially therethrough when the block faces are actuated to engage the tubular, an extrusion gap forming between each recess and the tubular. Each ram block comprises a semi-circular primary seal extending transverse to an axis of the recess, across each block face and about the recess for sealingly engaging the opposing face and the portion of the circumference of the tubular received therein; and at least a first semicircular backup ring extending transverse to its respective recess and located within a corresponding annular groove adjacent the primary seal, the annular groove located downstream of the primary seal. Each backup ring has a cross-sectional ring profile having an inner diameter, an outer diameter, an axial offset between the outer diameter and the inner diameter, a seal side facing the primary seal and a block side facing the block wherein the inner diameter at the seal side of the backup ring being adjacent the primary seal and upon axial loading of the seal side by the primary seal when compressed by actuation of the block faces, the axial offset flattens and the inner diameter diminishes to reduce the extrusion gap.

BRIEF DESCRIPTION OF THE DRAWINGS

FIGS. 6A and 6B are partial end views of the annular groove and installed backup ring having a circular ball and socket bearing surface interface, and a conical interface respectively, the displaced inner edge of the ring profile shown in dotted lines;

DESCRIPTION OF THE EMBODIMENTS

According to embodiments herein, apparatus and methodologies for improving the seal of ram-style blowout preventers (BOPs) are provided. Generally, a modified ram block for a BOP is provided, each ram block comprising a seal and backup ring configuration for improved extrusion control.

Figure 8:
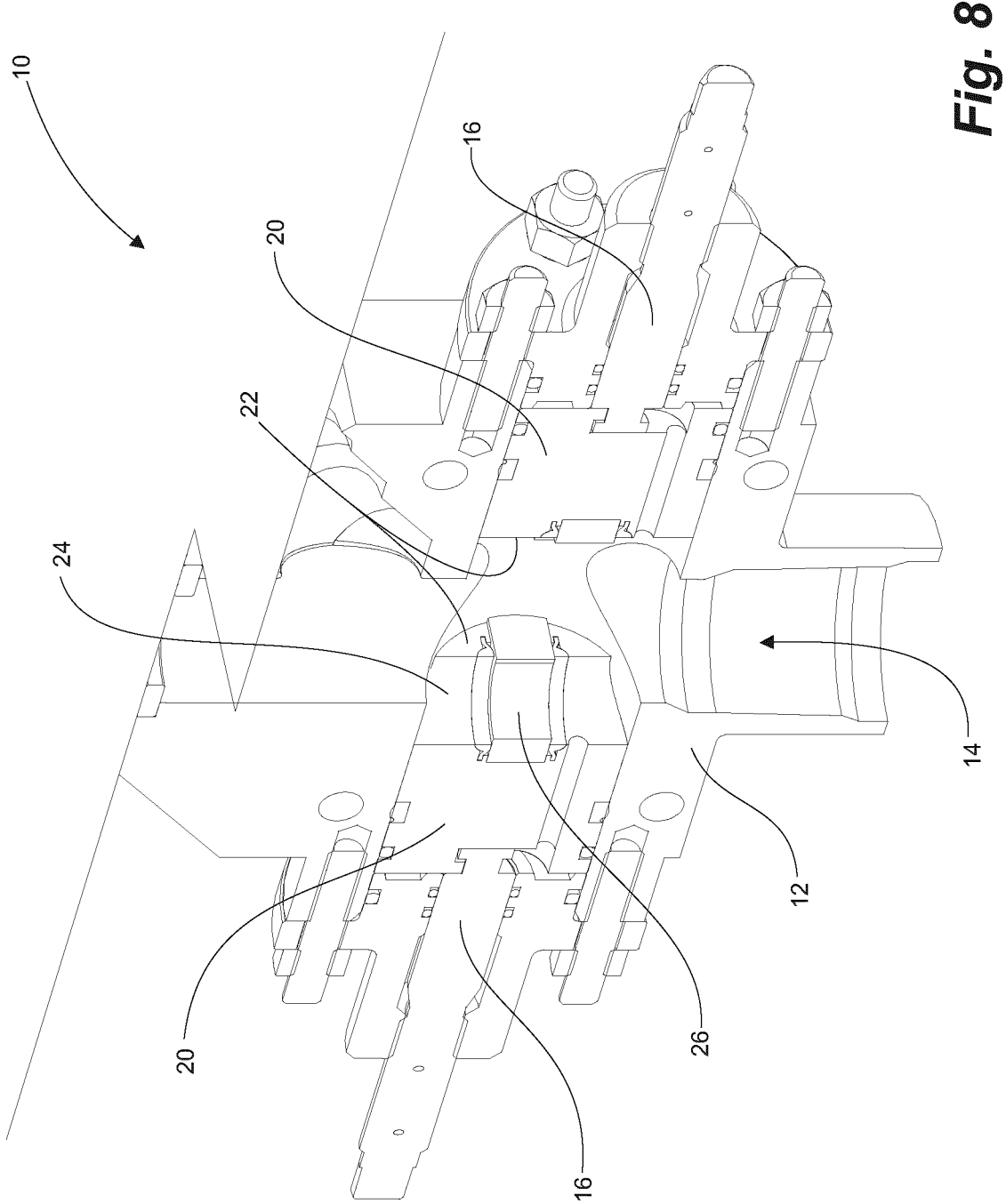
FIG. 8 is a perspective, cross-sectional view of a BOP, fit with opposing the ram blocks and installed backup rings of FIGS. 3A through 4B.

With reference to FIG. 8, a blowout preventer 10 commonly comprises a main body 12 connected at a wellhead forming a through bore 14 in fluid communication with a well. The through bore 14 forms part of a main flow channel for fluids flowing from the well. The body 12 is provided with a pair of opposing ram actuators 16,16 arranged perpendicularly to the bore 14.

Each ram actuator 16 is provided with ram "block" 20 on the inside end thereof, each block 20 being fit slidably yet sealably to the main body. The opposing blocks 20,20 have opposing faces 22,22 that engage each other when actuated, and are specifically configured for the particular type blowout preventer, such as for a pipe ram type, blind ram type, shear ram type, or multi-ram type. The ram blocks 20 are manufactured of metal and include an arcuate recess 24 at their faces and aligned with an axis of the through bore 14. Actuated to close, the opposing recesses 24,24 receive and grip a tubular therebetween in metal-to-metal contact. To seal the blocks 20,20 to the tubular, elastomeric primary seals 26,26 extend circumferentially about each arcuate recess 24 and stand proud, radially inwardly, of the face 22 to sealingly engage the tubular or the opposing seal 26.

Given that the extrusion gaps and the pressures imposed on the seals of a blowout preventer are challenging to control, an improved ram block is provided having a modified ram block, seal and backup configuration to improve blowout preventer pressure capability. Applicant contemplates that the extrusion gap in a blowout preventer may be as large as approximately 0.030 inches which is difficult to seal at large pressures given the competing requirements of sealing materials and seal integrity. Although the characteristics of the sealing material can be modified to resist extrusion (i.e., a harder or stronger material can be used), not all materials sealingly engage as well as other, particularly at lower pressures.

Correspondingly, however, as the extrusion gap increases, the associated pressure capacity falls or fails. For example, it is observed that where the extrusion gap is zero and a 90 duro material is used, the obtainable pressure could be as high as 10,000 psi. However, as the extrusion gap increases to 0.005 inches, the pressure capacity decreases to 4,000 psi, and where the extrusion gap is as large as 0.030 inches, the pressure capacity may be a mere 200 psi before failure.

Figure 1A:
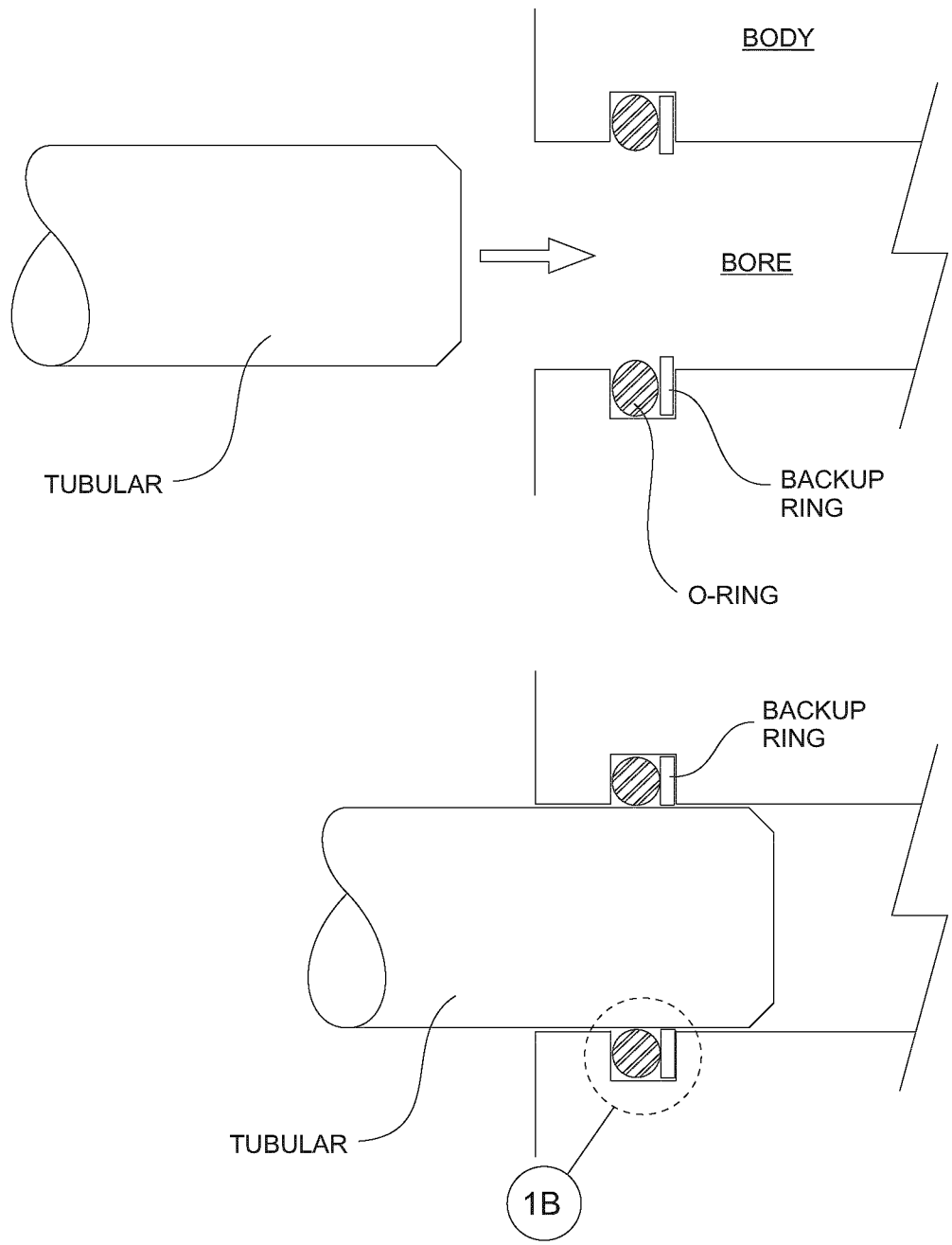
FIG. 1A is a schematic representation of a prior art annular seal and backup ring receiving a tubular, the backup ring undersized and expanded upon receipt of the tubular.
Figure 1B:
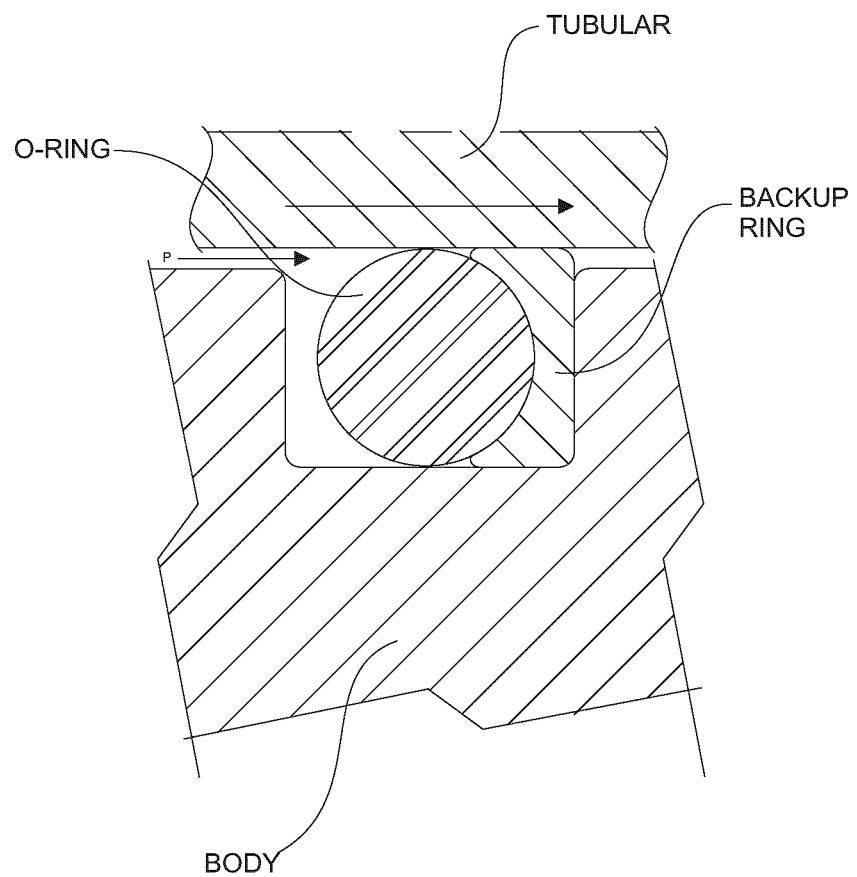
FIG. 1B is a close up of a prior art seal and backup ring with the tubular received therein according to FIG. 1A.

Prior art attempts to improve the sealing capacity of blowout preventers have been made, some of which include the use of a backup ring, in conjunction with the primary seal. As shown in FIG. 1A, a simplistic prior art sealing situation is illustrated having a tubular or rod fit to a bore. Known backup rings are typically positioned axially "behind" or axially positioned between a seal and an extrusion gap to prevent the seal from being extruded past the backup ring and through the gap. The seal and the backup ring are supported in a body through which the tubular extends. For example, for the sealing of a tubular rod of 1.500 inches in diameter, a conventional, prior art annular backup ring for an O-ring seal, as shown, would have a nominal inside diameter of 1.490 inches. Upon axial insertion of the rod into the body and through the annular seal, the backup ring stretches or expands from 1.490 to the tubular diameter of 1.500 inches. The backup ring is placed into tension.

In a ram-style BOP, having opposing semi-circular seal components that are circumferentially discontinuous, such a unitary backup ring arrangement is not practical. The seal and backup ring are discontinuous, being split into two semi-circular components and semi-circular components is positioned in one of the two opposed ram blocks. In a ram-style BOP, each of the opposing ram blocks are of formed metal and include an arcuate recess or radial groove at their front faces to accommodate and grip the tubular polish rod in a metal-to-metal contact. An elastomeric primary seal, arranged transversely across the arcuate recess, seals against the polish rod. The primary seal is soft and susceptible to extrusion along an extrusion gap formed between the rod and the recess in the body or, in this instance, each of the ram blocks.

According to embodiments herein, the present blowout preventer provides the use of an axially compressible backup ring to prevent the extrusion and corresponding failure of the one or more primary ram block seals. In some embodiments, the primary seal may comprise a common polyurethane seal, having a mid-range strength, such as in the range of approximately 80 Duro. A wide range of sealing pressures is obtainable with a primary seal that is soft, flexible and conforms to the configurations of the design of the blowout preventer. It is contemplated that other materials and or strengths of material may be used, for ease of manufacture and/or installation purposes. Accordingly, in some embodiments, a backup ring comprises a flexible material that is stiffer or more rigid than the primary seal. For example, the present backup ring may comprise an engineered plastic, such as carbon-filled Polytetrafluoroethylene (PTFE) or the like.

The backup ring is positioned axially adjacent the seals in a ram-type blowout preventer in a manner that enables the inner diameter of the backup ring, when compressed, to reduce in diameter to radially approach the tubular, minimizing or eliminating the extrusion gap. In embodiments, the inside edge of the backup ring sealingly engages the tubular. A backup ring is provided at least downstream of the primary seal, downstream being opposite a pressure side of the primary seal.

Figure 2:
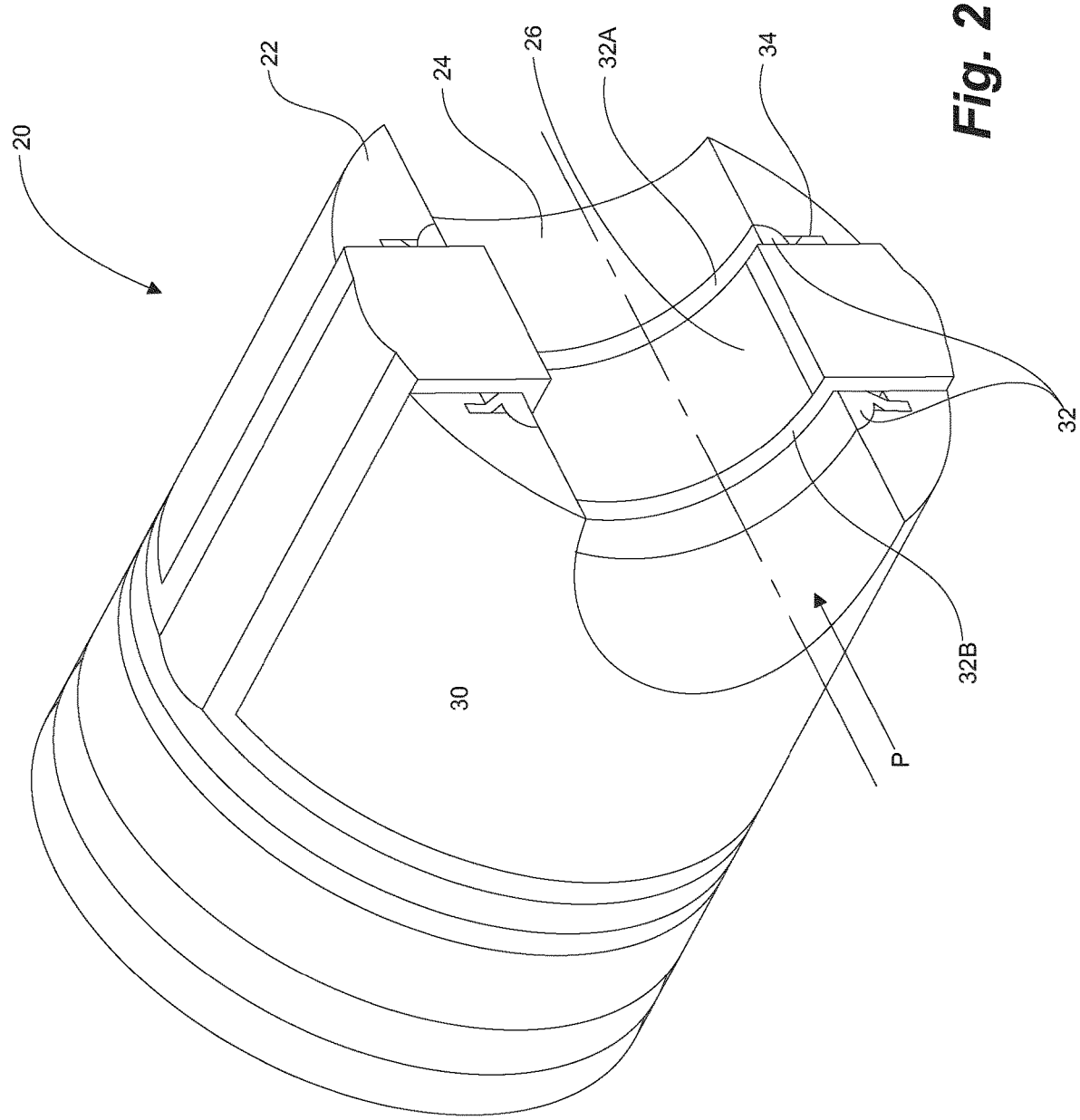
FIG. 2 is a perspective view of a ram block prior to insertion of a tubular therethrough, the ram block being fit with a backup ring according to one embodiment.
Figure 3A:
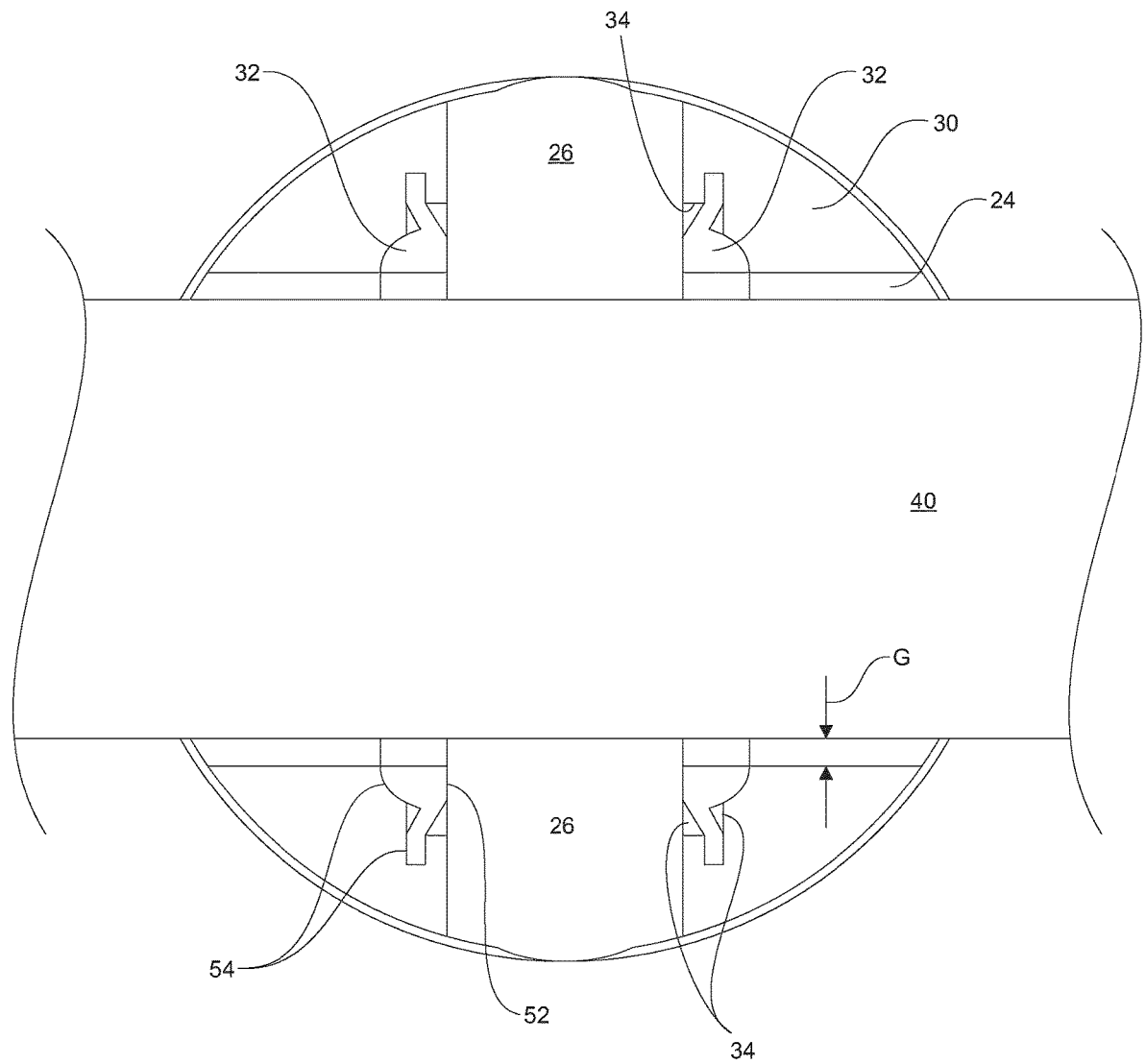
FIG. 3A is an end view of a ram block prior to compression of the primary seal by a tubular, the ram block with a pair of straddling backup rings.
Figure 7:
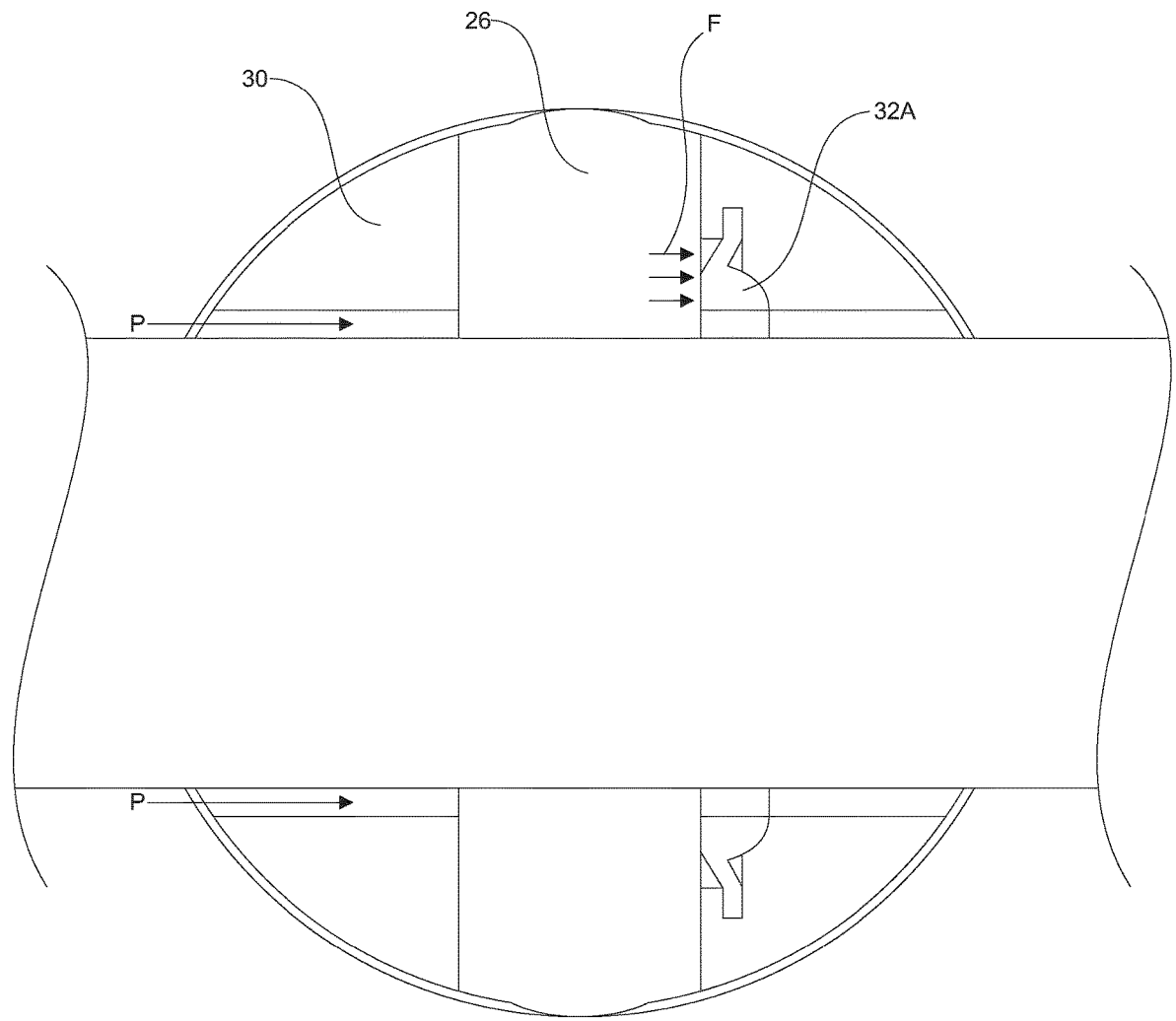
FIG. 7 is an end view of a ram block prior to compression of the primary seal by a tubular, the rob block fit with only a single downstream backup ring.

In more detail, and having reference to FIG. 2, one ram block 20 is shown, illustrating the body 30 of the block to which is fit the primary seal 26 supported in the body 30 and extending about a circumference of the recess 24 transverse to the axis. One or more backup rings 32 are supported in an annular groove 34 in the body 30 axially adjacent the primary seal 26. At least a first backup ring 32A is supported in an annular groove 34 in the body 30 axially adjacent the primary seal 26. As shown in FIGS. 3A and 7, with pressure applied to the primary seal 26, the first backup ring 32A is located axially downstream of the primary seal. FIG. 7 illustrates an arrangement having only a single backup ring 32A such as in instances where fluid pressure P is consistent and from an opposing face 22 of the primary seal 26. Returning to FIG. 3A, for a variety of scenarios including reversibility of the ram block, for ease of installation, assembling or manufacturing stability for the primary seal 26, a second backup ring 32B can be provided. The pair of backup rings 32A,32B straddle the primary seal 26.

Turning to FIGS. 3A to 3D, the recess 24 of block 30 receives a tubular 40. Before the block 30 is engaged with the tubular, the primary seal is relaxed. Each backup ring 32 is shown in a relaxed position, having an inner diameter ID extending about the tubular and outer diameter for receipt into the annular groove 34, and an axial thickness or axial extent AE.

The backup ring is flexible, having a cross-sectional ring profile 50 axially compressible between the resting position and compressed position, wherein upon axial loading by the primary seal 26, the ring profile flattens, the axial extent AE narrows and the inner diameter ID diminishes correspondingly to reduce the extrusion gap G.

The ring profile 50 has an axial extent AE having a seal side 52 at the inner diameter ID axially adjacent the primary seal 26 and a block side 54 at the outer diameter OD spaced axially from the primary seal 26. The seal side of the ring profile has an axial offset between the inside and outside diameters for axial displacement when engaged.

The ring profile and the flexibility of the backup ring behaves like a spring washer enabling axial actuation between the relaxed and compressed states. As the backup ring 32 is formed of stiffer material than that of the primary seal 26, the axial actuation is primarily through a manipulation or displacement of the ring profile 50, not solely through compression of the material itself as is the case for the primary seal.

Figures 3B, 3C:
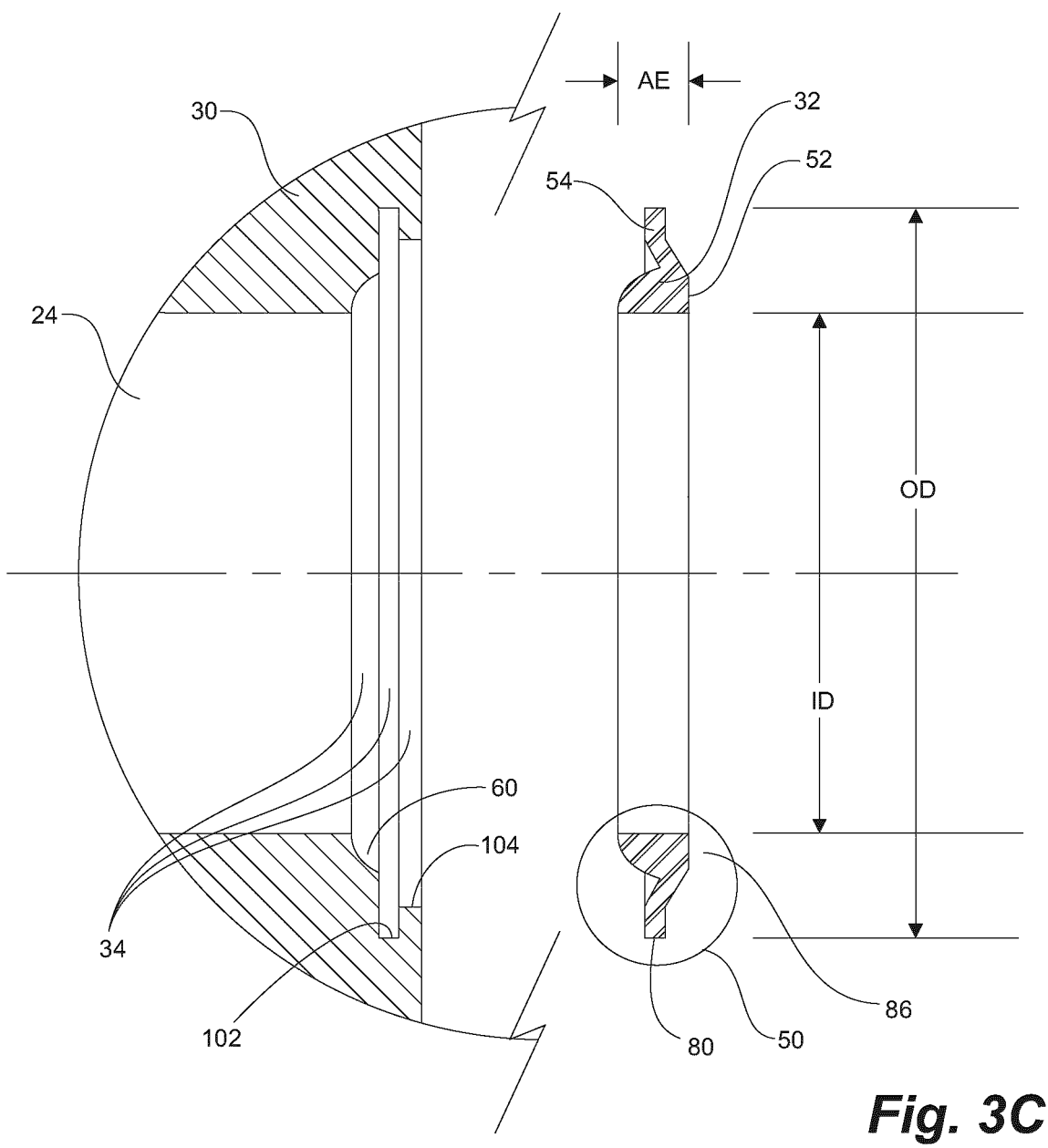
FIG. 3B is an end view of one annular groove with the tubular omitted for viewing the groove in its entirely.
FIG. 3C is an end view of one backup ring with the block and tubular omitted.
Figure 3D:
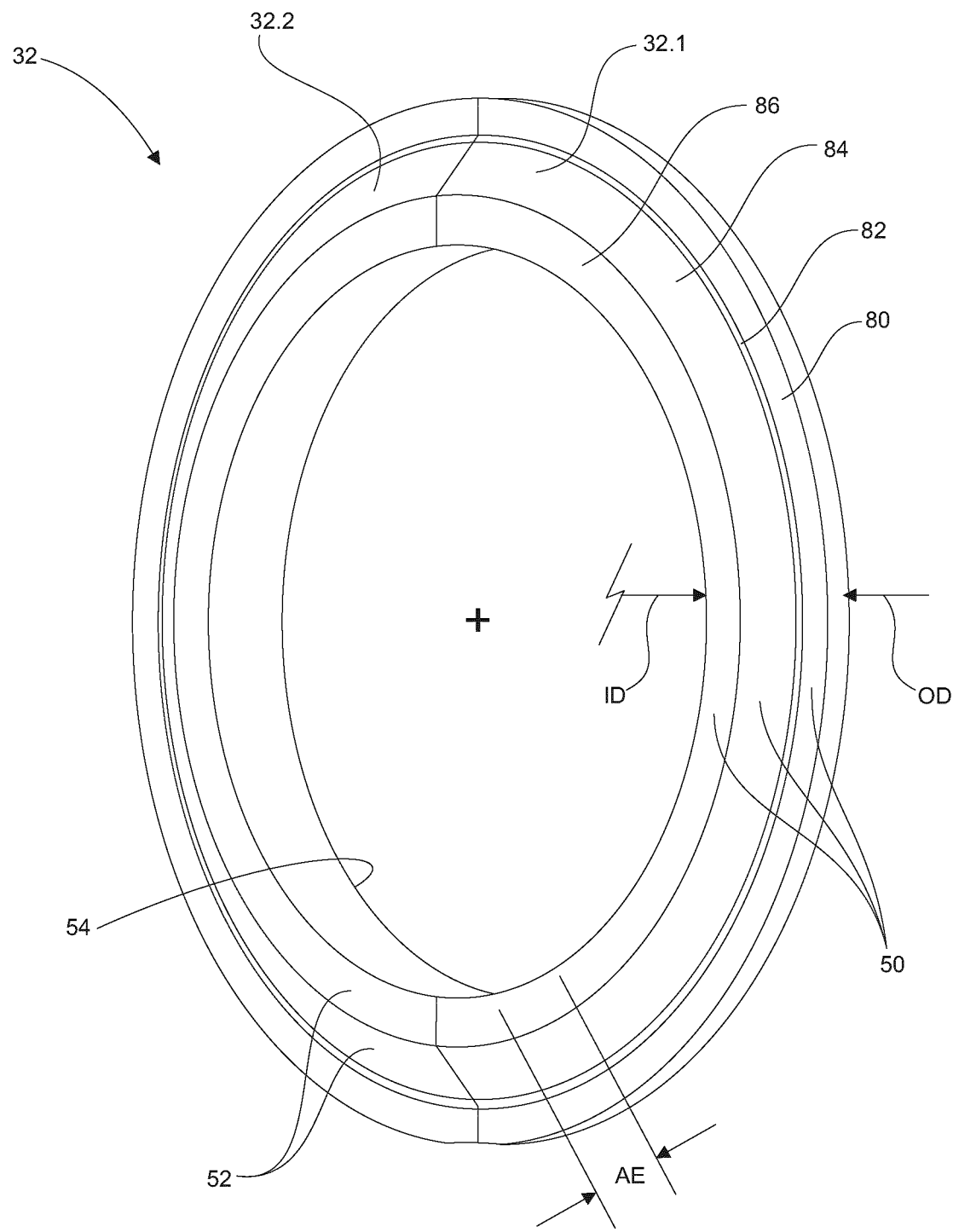
FIG. 3D is a perspective view of the backup ring of FIG. 3A shown separate from the ram block and in the uncompressed state.

As shown in FIG. 3D, the backup ring 32 is discontinuous and comprises a first semi-circular backup ring 32.1 and a second semi-circular backup ring 32.2. The seal side 52 at the outside diameter is spaced axially from the seal side 52 at the inside diameter, forming an axial offset and forming the axial extent AE.

Figure 4A:
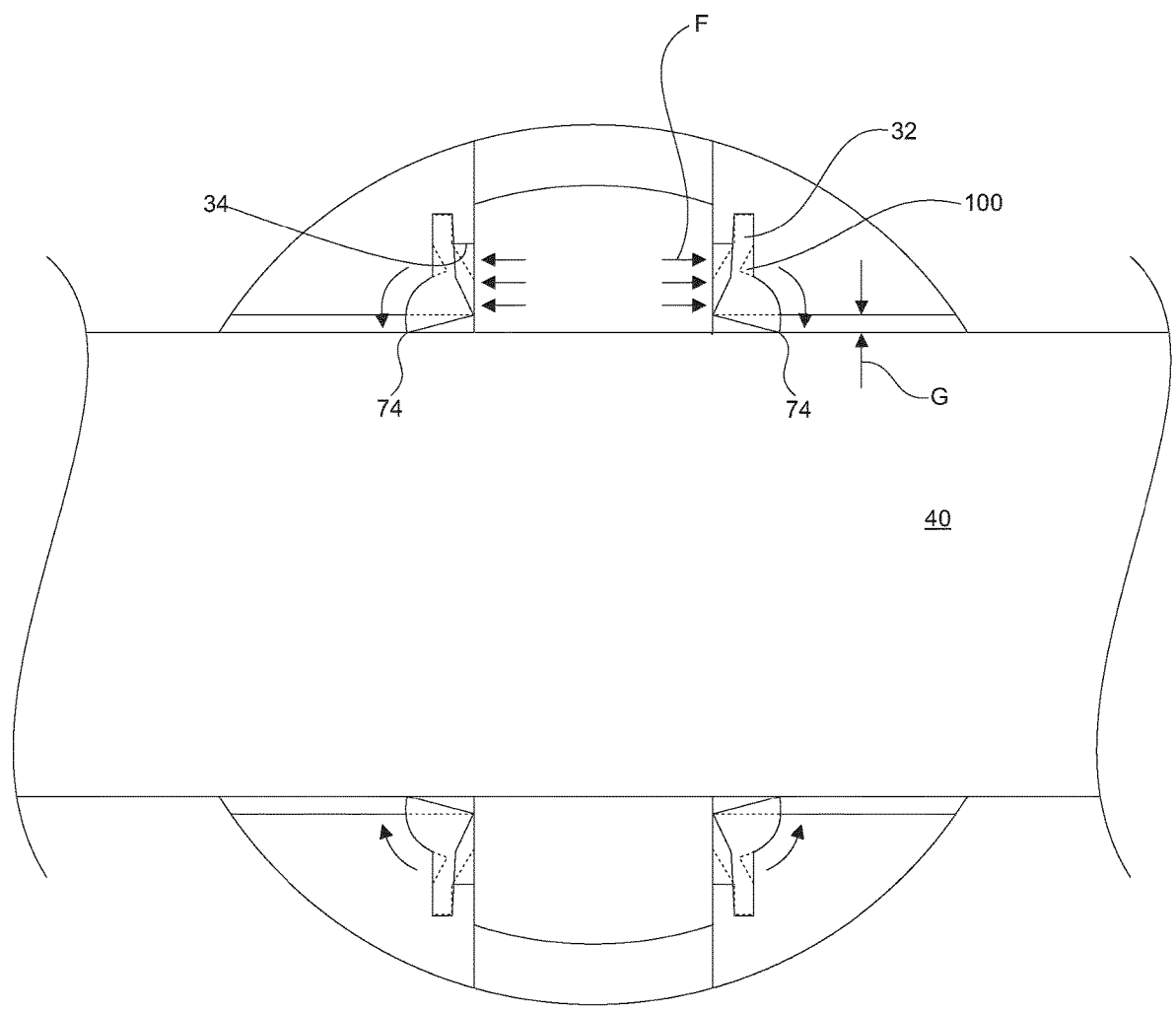
FIG. 4A is an end view of the ram block of FIG. 3A after compression of the primary seal by full engagement with the tubular.
Figure 4B:
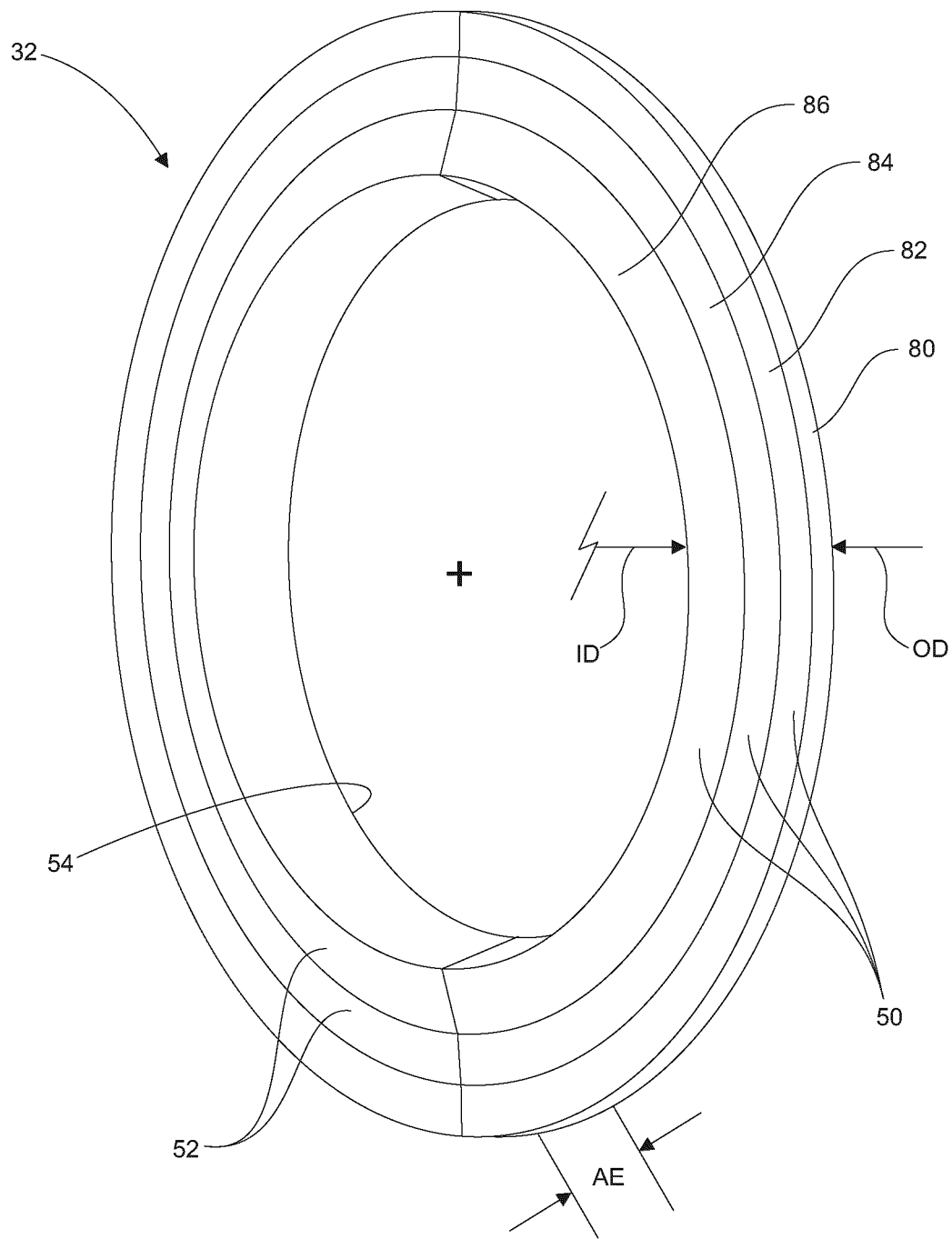
FIG. 4B is a perspective view of the backup ring of FIG. 4A shown separate from the ram block and in the compressed state.
Figure 5A:
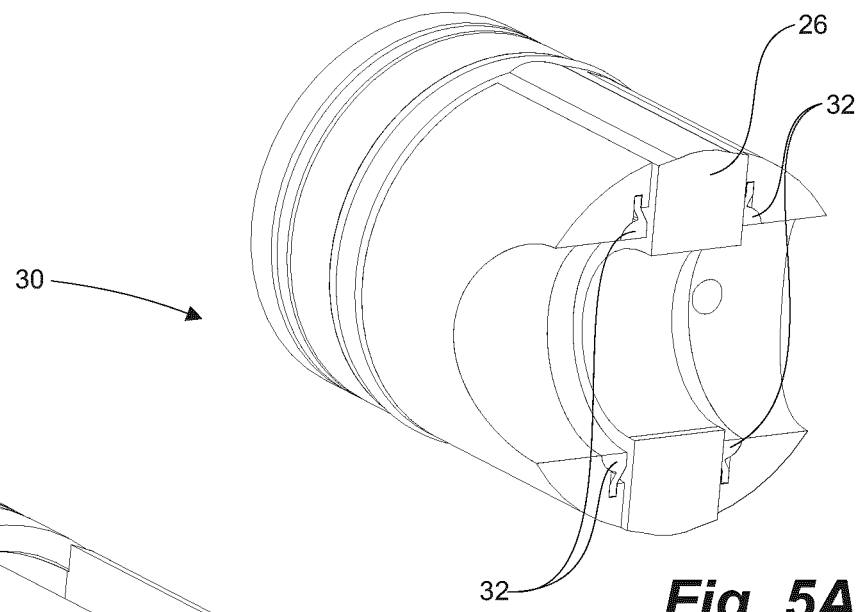
FIGS. 5A, 5B and 5C are perspective views of a ram block prior to insertion of a tubular therethrough, the ram block being shown fit with a primary seal and straddling backup rings, fit with just the backup rings, and with neither primary seal nor backup rings installed respectively.
Figure 5B:
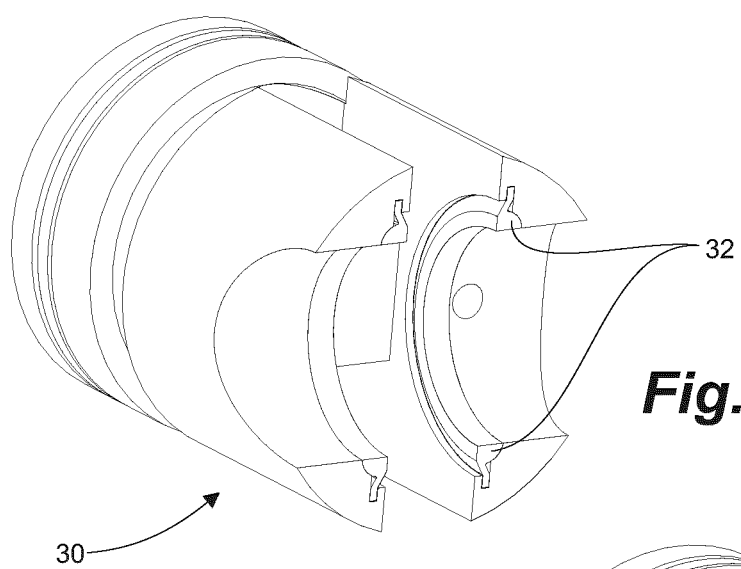
Figure 5C:
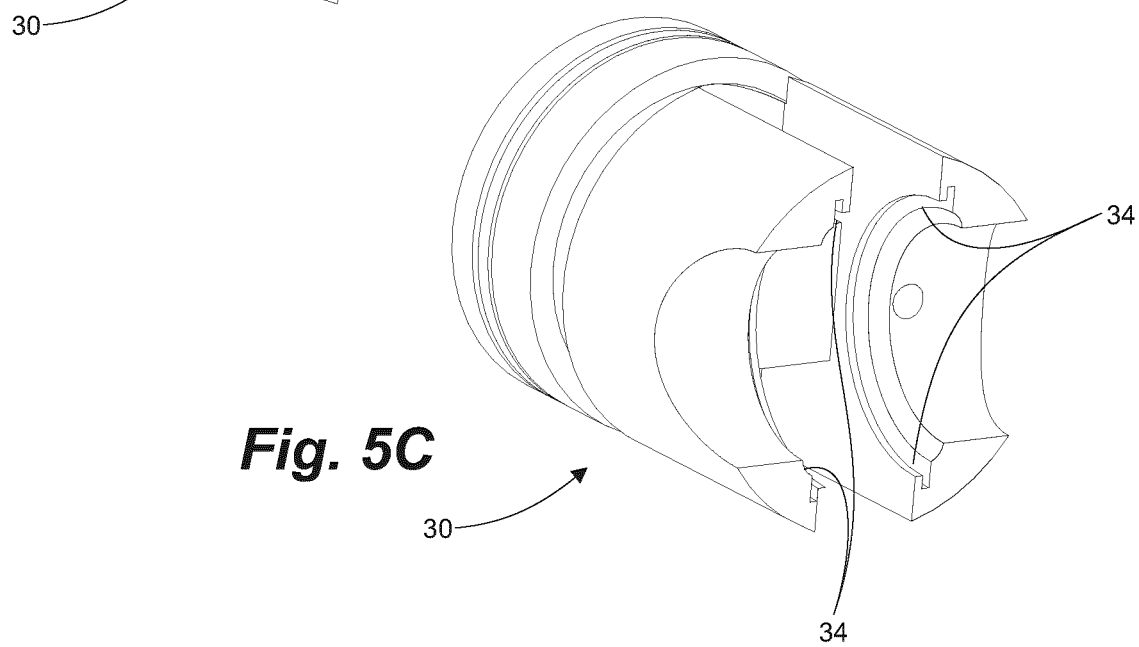

Turning to FIGS. 4A and 4B, the block 30 is shown engaged with the tubular 40, the primary seal become compressed. As the dimensional tolerance between the recess and the tubular is restricted, radial compression of the primary seal 26 results in an axial spread and axial force F is applied to the backup rings 32. Each backup ring 32 is shown in the compressed position, the axial extent AE reducing in thickness, flattening the ring profile 50 and directing the inner diameter D radially inward into the extrusion gap G. The inner diameter ID diminishes, encroaching on the extrusion gap G, to minimize or even close the gap G.

The magnitude of the reduction or diminishing of the inner diameter ID, is favorably accentuated by the profile 50 of the backup ring 32, and further accentuated by a cooperation between the annular groove and the ring profile.

As introduced above, the ring profile 50 has this axial extent AE. The axial extent can be deflected or compressed axially, correspondingly displacing the inner diameter radially inwardly. A ring profile such as an arcuate profile, being displaceable axially is provided with a seal face 52 that is engageable with the primary seal and forcibly displaced axially away therefrom and relative to the outside diameter OD, flattening the ring profile 50, the inner diameter diminishing to reduce the extrusion gap G.

With reference to FIGS. 3B, 3C and 6A the ring profile adjacent the magnitude of the radial movement inner diameter can be accentuated by rotating the material of the ring from the axial to the radial. As shown in FIG. 6A, the block side 54 of the ring 32 is formed with a circular profile 70 and the annular groove 34 is formed with a bearing surface such as a circular socket 72. The annular groove 34 acts to support the backup ring 32, and the circular socket 72 forms a fulcrum or sliding bearing surface for directing the block side 54 of ring 32, adjacent the inner diameter ID to rotate radially inward into the extrusion gap.

A simple arcuate profile, having a ring profile height between the OD and ID of about one quarter inch and an ID of about 1.5 inches, will have a modest reduction in the inner diameter ID of about 0.01 inches on an axial compression of about 0.04 inches. However, as shown in FIG. 6A, with an added rotational component, an axial displacement of 0.04 inches to collapse the profile 50 the 0.04 inches results in a 1:1 translation of an inner edge 74 of the block side's inner diameter of 0.04 inches, more than the typical 0.03 inch gap G. Similarly, with reference to FIG. 6B, in a more angular annular groove and ring arrangement, a linear bearing surface or ramp, directs the block side 54 of ring 32, adjacent the inner diameter ID, to rotate and extent radially inward into the extrusion gap, an axial displacement of 0.04 inches to collapse the profile 50 about 0.04 inches results in a near 1:1 translation of the inner edge 74 of the block side's inner diameter of about 0.037 inches.

In summary, the axial extent of the ring profile has the seal side 52 at the inner diameter axially adjacent the primary seal 26 and the outer diameter spaced axially from the primary seal, The annular groove forms a bearing surface or socket 72 and the body side 54 of the ring profile 50 at the inner diameter ID has a generally bearing profile 70 that is slidably supported by the socket 72 wherein, upon axial loading of the seal side by the primary seal, the ring profile flattens and the bearing profile slides along the socket 72 for directing the inner edge 74 radially inward into the extrusion gap G.

Accordingly, the anti-extrusion apparatus effectively seals and avoiding extrusion of the primary seal 26 when applied to opposing ram blocks 30 of a blowout preventer 10.

The axial compression of the ring profile is facilitated by a ring profile that is axially dispaceable. One arrangement, as shown in FIGS. 3D and 6A is a generally arcuate ring profile 50, having a convex seal side 52 facing the primary seal 26 and a concave block side 54 facing the block 30 of the annular groove 34, wherein, upon axial loading of the seal side 52 by the primary seal, the axial offset or extent AE of the ring profile flattens the axial offset of the seal side, flattening the axial extent of the ring.

The convex seal side 52 can comprise a first planer portion 80 extending radially from the outer diameter OD to a first transition shoulder 82 intermediate the outer and inner diameters OD,ID, and a second conical portion 84 ramps from the first transition shoulder 82 towards the primary seal to form the axial extent AE, and a third portion 86 extending radially to the inside diameter ID. The first planer portion assists in securing the backup ring 32 axially within the annular groove 34 and axially fixes the axial position thereof. Upon axial loading of the seal side 52 by the primary seal, at least second conical portion 84 flattens.

Similarly, the concave block side 54 comprises the first planer portion 80 extending radially from the outer diameter to a second transition shoulder 92 intermediate the outer and inner diameters, and a second conical portion 94 ramping from the first transition shoulder towards the primary seal and a third bearing portion 96 extending generally radially to the inside diameter ID. An axial clearance 100 is formed between the annular groove 34 to facilitate fattening of the ring profile. As discussed in the context of the circular profile and socket above for FIG. 6A, the clearance 100 is formed between the ramped conical portion 94, a clearance of 0.04 inches resulting in a collapse of 0.04 inches and a corresponding displacement of the inner edge 74 of 0.04 inches.

Accordingly, and with reference to FIG. 3B, each annular groove 34 adjacent the primary seal comprises a first planer groove 102 for receiving the backup ring's first planer portion 80 at the outer diameter. The groove 34 is also open axially to the primary seal at an adjacent groove opening 104 so that axial displacement of the primary seal can bear on at least the third portion 86 of the backing ring to effect compression thereon.

Herein the primary seal 26 is axially supported by at least the first backup ring 32A positioned adjacent thereto, the backup ring 32A being configured to compress axially under pressure, distinguished from with conventional backup rings that are placed in tension when activated. Comparing the prior art FIG. 1A and the current embodiment of FIGS. 3D and 4B for a 1.500 inch tubular, the standard prior art backup ring is placed in tension by stretching the inner diameter from 1.490 to 1.500. Having a second conical portion 84 and a clearance of about 0.06 inches within the groove 34, the illustrated embodiment of the backup ring 32A is compressed axially to flatte4nt the profile (FIG. 3D to FIG. 4B) with the inner diameter ID reducing in the order of about 1.560 to 1.500.

Accordingly when un-activated, the present backup ring 32 comprises a larger inside diameter ID than the tubular extending therethrough for trouble free installation. When the two halves of the opposing ram blocks are activated, and close against each other, the primary seal and the backup ring or rings swell from the mechanical compression. The relatively thin ring profile collapses axially, and the inside diameter ID of the ring decreases. The annular bearing portion of the ring rotates radially inwardly, causing the inside edge to approach or even sealingly engage the outer circumference of the tubular. As such, in compression, the particular shape of the backup ring results in an overall radial lengthening of the ring, creating better contact between the two halves of the semi-circular rings. Accordingly, Applicant believes that the depicted embodiments, despite the inherent difficulties with split seals and backup rings, may enable a ram-type blowout preventer to contain pressures in an extrusion gap up to approximately 10,000 psi.

The invention claimed is:

1. An anti-extrusion apparatus for a tubular extending through bore in a body and forming an extrusion gap therebetween, comprising
   a primary seal supported in the body and extending about a circumference of the tubular; and
   a backup ring supported in an annular groove in the body axially adjacent the primary seal, the backup ring having an inner diameter extending about the tubular and a cross-sectional ring profile defined by an inner diameter, an outer diameter, and an axial offset between the outer diameter and the inner diameter, the offset providing for the backup ring to be axially compressible between a resting position and compressed position, wherein upon axial loading by the primary seal the ring profile flattens and the inner diameter diminishes to reduce the extrusion gap.

2. The anti-extrusion apparatus of claim 1 wherein the ring profile has an axial extent having the inner diameter axially adjacent the primary seal and an outer diameter spaced axially from the primary seal.

3. The anti-extrusion apparatus of claim 1 wherein the backup ring is a spring washer.

4. The anti-extrusion apparatus of claim 1 wherein
the ring profile has an axial extent having the inner diameter axially adjacent the primary seal and an outer diameter spaced axially from the primary seal; and
the annular groove forms a bearing surface for directing the inner diameter radially inward into the extrusion gap.

5. The anti-extrusion apparatus of claim 1 wherein the ring profile has:
an axial extent having a seal side at the inner diameter axially adjacent the primary seal and an outer diameter spaced axially from the primary seal;
the annular groove forms a circular bearing surface adjacent the inside diameter; and
a body side of the ring profile at the inner diameter has a generally circular profile that is supported by the a circular bearing surface wherein, upon axial loading of the seal side by the primary seal, the ring profile flattens and the circular profile rotates within the circular bearing surface for directing the inner diameter radially inward into the extrusion gap.

6. The anti-extrusion apparatus of claim 1 wherein a pair of backup rings are provided, axially straddling the primary seal.

7. Anti-extrusion apparatus of claim 1 wherein the body comprises opposing ram blocks of a blowout preventer for receiving the tubular therebetween, the primary seal and the backup ring each being semi-circular and discontinuous, each semi-circular primary seal and backup ring being supported in its respective ram block, each ram block having a block face and tubular-receiving recess formed across the face, each recess receiving a portion of a circumference of the tubular extending axially therethrough when the block faces are actuated to engage the tubular, the extrusion gap forming between each recesses and the tubular; and wherein for each ram block
the semi-circular primary seal extends transverse to an axis of the recess, across each block face and about the recess for sealingly engaging the opposing face and the portion of the circumference of the tubular received therein; and
the semi-circular backup ring extends transverse to its respective recess and within its corresponding annular groove adjacent the primary seal, the annular groove located downstream of the primary seal.

8. A blowout preventer (BOP) comprising the anti-extrusion apparatus of claim 1.

9. An anti-extrusion apparatus for a tubular extending through bore in a body and forming an extrusion gap therebetween, comprising
a primary seal supported in the body and extending about a circumference of the tubular; and
a backup ring supported in an annular groove in the body axially adjacent the primary seal, the backup ring having an inner diameter extending about the tubular and a cross-sectional ring profile axially compressible between a resting position and compressed position, wherein:
upon axial loading by the primary seal the ring profile flattens and the inner diameter diminishes to reduce the extrusion gap; and
the backup ring is discontinuous, comprising two semi-circular backup rings.

10. Anti-extrusion apparatus for a blowout preventer, comprising:
opposing ram blocks, each ram block having a block face and tubular-receiving recess formed across the face, each recess receiving a portion of a circumference of a tubular extending axially therethrough when the block faces are actuated to engage the tubular, an extrusion gap forming between each recess and the tubular, each ram block comprising:
a semi-circular primary seal extending transverse to an axis of the recess, across each block face and about the recess for sealingly engaging the opposing face and the portion of the circumference of the tubular received therein; and
at least a first semicircular backup ring extending transverse to its respective recess and located within a corresponding annular groove adjacent the primary seal, the annular groove located downstream of the primary seal, and
each backup ring having a cross-sectional ring profile having an inner diameter, an outer diameter, an axial offset between the outer diameter and the inner diameter, a seal side facing the primary seal and a block side facing the block wherein
the inner diameter at the seal side of the backup ring being adjacent the primary seal and upon axial loading of the seal side by the primary seal when compressed by actuation of the block faces, the axial offset flattens and the inner diameter diminishes to reduce the extrusion gap.

11. The anti-extrusion apparatus of claim 10 wherein the at least a first semicircular backup ring comprises the first backup ring and a second semicircular backup ring, each of which extend transverse to its respective recess and are located within a corresponding annular groove adjacent to and straddling the primary seal.

12. The anti-extrusion apparatus of claim 10 wherein ring profile of each backup ring is generally arcuate.

13. The anti-extrusion apparatus of claim 10 wherein each ring profile is generally arcuate, having a convex seal side facing the primary seal and a concave block side facing the block, wherein, upon axial loading of the seal side by the primary seal, the axial offset of the ring profile flattens.

14. The anti-extrusion apparatus of claim 13 wherein the convex seal side comprises a first planer portion extending radially from the outer diameter to a first transition shoulder intermediate the outer and inner diameters, and a second conical portion ramps from the first transition shoulder towards the primary seal to form the axial offset, and a third portion extending radially to the inside diameter, wherein, upon axial loading of the seal side by the primary seal, the second conical portion flattens.

15. The anti-extrusion apparatus of claim 13 wherein the concave block side comprises a first planer portion from the outer diameter to a second transition shoulder intermediate the outer and inner diameters, and a second conical portion ramping from the first transition shoulder towards the primary seal and a third portion extending to the inside diameter.

16. The anti-extrusion apparatus of claim 13 wherein
the convex seal side comprises a first planer portion extending radially from the outer diameter to a first transition shoulder intermediate the outer and inner diameters, and a second conical portion ramps from the first transition shoulder towards the primary seal to form the axial offset, and a third portion extending radially to the inside diameter, wherein, upon axial loading of the seal side by the primary seal, the second conical portion flattens; and the concave block side comprises a first planer portion from the outer diameter to a second transition shoulder intermediate the outer and inner diameters, and a second conical portion ramping from the first transition shoulder towards the primary seal and a third portion extending to the inside diameter.

17. The anti-extrusion apparatus of claim 16 wherein each annular groove adjacent the primary seal comprises a first planer groove for receiving the backup ring's first planer portion at the outer diameter.

18. The anti-extrusion apparatus of claim 13 wherein the inside diameter block side portion of each ring profile has a generally circular profile that curves radially inward towards the recess and axially away from the primary seal and an inner portion of each annular groove, adjacent the recess, has a generally circular socket profile that corresponds to the backup ring's profile, wherein, upon axial loading of the seal side by the primary seal, the ring profile flattens and the circular ball profile rotates within the socket profile.

* * * * *